Nov. 21, 1939.  B. S. AIKMAN  2,180,856
PRESSURE GOVERNOR
Filed March 6, 1937
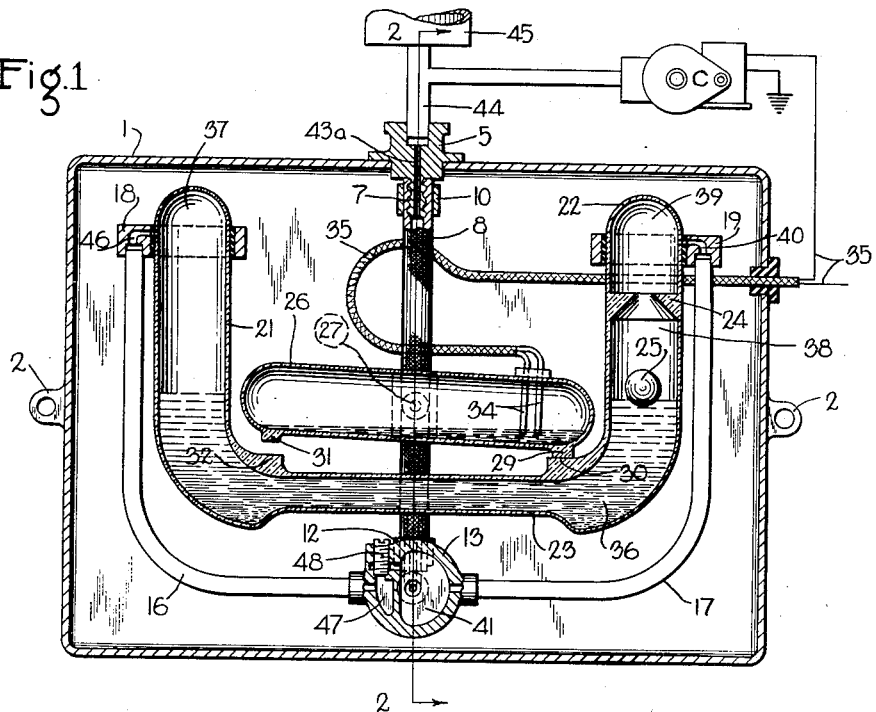
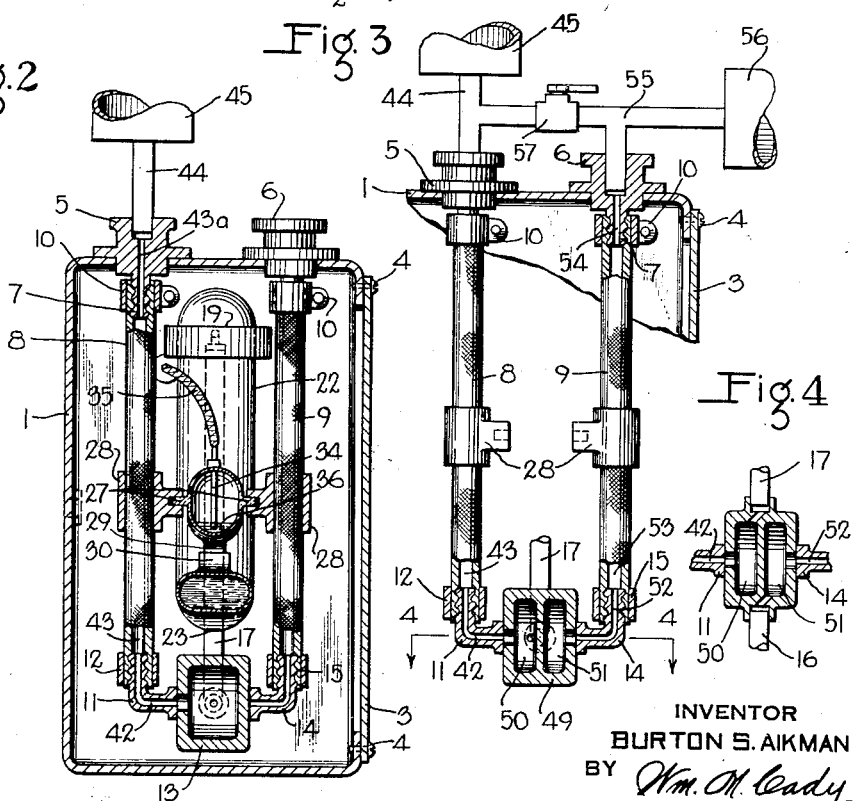
INVENTOR
BURTON S. AIKMAN
BY Wm. M. Cady
ATTORNEY

UNITED STATES PATENT OFFICE 2,180,856

PRESSURE GOVERNOR

Burton S. Aikman, Wilkinsburg, Pa., assignor to The Westinghouse Air Brake Company, Wilmerding, Pa., a corporation of Pennsylvania Application March 6, 1937, Serial No. 129,524

11 Claims. (Cl. 200—81)

This invention relates to pressure governors and more particularly to the type employed for controlling the pressure of fluid in a receiver or the like.

Pressure governors are commonly employed for controlling the operation of electric motor driven air compressors to compress air into a reservoir or receiver. In this use, the governor is usually controlled by the pressure of fluid acting in the receiver and is operative when the pressure of fluid in the receiver becomes reduced to a predetermined low degree to start the compressor for increasing the pressure in the receiver, and when the pressure in the receiver is built up to a predetermined degree to stop the compressor, so as to thereby maintain in the receiver a fluid pressure which varies between predetermined limits. Such governors are usually adjustable so as to cause the compressor to start and stop at higher or lower receiver pressures, and are further adjustable to vary the range or differential in receiver pressures, between the starting and stopping of the compressor, if it is desired to maintain the pressure in the receiver between greater or less limits.

Pressure governors are also used to control in various other ways the pressure of fluid acting in a receiver. For instance, pressure governors are at times used to control the operation of feed valves which are employed to control the supply of air or gas from a high pressure main to a low pressure main. In this type of service the governor is controlled by the pressure of fluid in the low pressure main and acts to cause the feed valve device to maintain a pressure in the low pressure main which is dependent upon the adjustment of the governor.

One object of the invention is to provide a novel pressure governor particularly adapted to control the operation of an air compressor, a feed valve device or the like, and which has no springs or other mechanical elements, as in conventional governors, which are subject to failure due to excessive wear, fatigue or the like.

Another object of the invention is to provide a novel pressure governor which is readily adjustable to provide for the maintenance of various degrees of fluid pressure in a receiver and which is also readily adjustable to vary the differential or range of fluid pressures maintained in the receiver.

Another object of the invention is to provide a novel governor particularly adapted, but not limited, to stationary installations and which is relatively simple in construction and which will remain reliable in operation and thereby provide an accurate pressure control over a long period of service.

Other objects and advantages of the invention will be apparent from the following more detailed description thereof.

In the accompanying drawing; Fig. 1 is a diagrammatic view of an air compressor control system including in vertical section a pressure governor embodying the invention; Fig. 2 is a sectional view taken on the line 2—2 in Fig. 1; Fig. 3 is a view similar to Fig. 2 embodying a modification of the invention; and Fig. 4 is a sectional view taken on the line 4—4 in Fig. 3.

As shown in the drawing, the pressure governor is associated with an electric motor driven air compressor C, for the purpose of illustrating an application of the invention, and is adapted to control the operation thereof to compress air into a receiver or reservoir 45, said governor comprising a rectangular shaped casing 1 having mounting lugs 2 adjacent the back wall thereof. The front of the casing 1 is open to provide access to the interior, and a cover 3 is secured to said casing over the front opening by screws 4 for closing said opening.

Two support members 5 and 6, which may be of identical construction, are secured in the top wall of the casing 1 in spaced relation, and each is provided with a nipple portion 7 extending into the interior of the casing. Two flexible, vertically depending hose or tubelike members 8 and 9 are disposed in the casing 1 with their upper ends secured to the nipples 7 by suitable clamps 10. An angle fitting 11 has one end secured in the lower end of flexible member 8 by a clamp 12 and the opposite end is secured to one side of an element 13, while a similar angle fitting 14 having one end secured in the lower end of the flexible member 9 by a clamp 15 has the other end secured to the opposite side of the element 13, the element 13 thus being carried between the lower ends of the two flexible elements 8 and 9.

Two oppositely disposed L shaped pipes 16 and 17 are provided with their lower ends connected to transversely opposite faces of the element 13 at right angles to the connection of the angle fittings 11 and 14 to said element. A ring 18 is secured to the upper end of the pipe 16 and a ring 19 is secured to the upper end of the pipe 17. A U shaped tube is disposed between the pipes 16 and 17 above the element 13 with one upwardly extending leg portion 21 secured in the ring 18 and the other upwardly extending leg portion 22 secured in the ring 19, these upwardly extending portions 21 and 22 of the tube being connected together at their lower ends through a substantially horizontal base tube portion 23.

An inverted valve seat 24 is provided inside of the leg portion 22 of the U shaped tube and a ball valve 25 is disposed in said tube below said seat and is adapted to engage said seat under conditions which will be hereinafter described.

A closed switch tube 26 is disposed between the two legs of the U shaped tube and is provided centrally on opposite sides with journal pins 27 bearing in oppositely disposed support elements 28, one of which is secured to the flexible tube 8 and the other to the flexible tube 9. The switch tube 26 is adapted to turn on its journal pins 27 relative to the U shaped tube and is provided at one end with a depending lug 29 adapted to engage a raised portion 30 of the U shaped tube for defining one position of said switch tube. The switch tube is provided at the opposite end with a depending portion 31 adapted to engage a raised portion 32 on the U shaped tube for defining another position of said switch tube.

Two suitably insulated electric contacts 34 are secured in one end of the switch tube 26. These contacts 34 extend down into the tube to near the bottom wall thereof and are connected outside of the tube to two suitably insulated flexible conductors 35 one of which is adapted to be connected to any suitable source of electrical energy and the other of which is connected to the electric motor of the compressor and through which electric current is adapted to be supplied for effecting the operation of said compressor. A certain amount of mercury is contained in the switch tube 26 adapted in the position of the switch tube shown in the drawing to bridge the contacts 34 for thereby closing the electric circuit through the conductors 35 to effect operation of the compressor C to compress air into the receiver 45, and adapted upon turning of the switch tube from the position shown in the drawing in a counterclockwise direction to its other position to move out of contact with the contacts 34 and thus open said circuit and cause the compressor C to stop operating.

The U tube is partially filled with any suitable movable body or mass 36, such as mercury. A control chamber 37 is thereby formed above the mercury in the leg portion 21 of the U tube and a chamber 38 is formed above the mercury in the leg portion 22, the chamber 38 being in communication through the central aperture in valve seat 24 with a chamber 39. The chamber 39 is connected to a passage 40 in the ring 19 and from thence through the pipe 17 to a chamber 41 in the element 13. The chamber 41 is connected through a passage 42 in the angle fitting 11, a passage 43 in the flexible support member 8 and a passage 43a in the support member 5 to a pipe 44 leading to the reservoir 45 in which the pressure of fluid is adapted to be controlled by the pressure governor. It will therefore be evident that the pressure fluid in chambers 39 and 38 above the mercury in the leg portion 22 of the U tube will vary with that in the receiver 45. The chamber 37 in the leg portion 21 of the U tube is connected through a passage 46 in the ring 18 to the pipe 16 which leads to a chamber 47 in the element 13 in which there is provided a communication controlled by a small, preferably needle type valve 48, connecting chamber 47 to chamber 41.

In operation, after installing the governor for controlling the operation of the electric motor driven air compressor C to compress fluid into the receiver 45, if the switch tube 26 does not occupy the position shown in the drawing, it is manually moved to this position, and in this position the body 36 of mercury in said tube is at the right hand end thereof bridging the contacts 34 and thereby closing the circuit through the conductors 35 to the motor of the air compressor C, causing said compressor to operate to compress fluid into the reservoir 45.

As the pressure of fluid in the receiver or reservoir 45 is increased by operation of the compressor C, the pressure of fluid in chamber 41 in the element 13 and in chambers 39 and 38 in the leg portion 22 of the U tube is correspondingly increased. The needle valve 48 is initially open so that fluid supplied to chamber 41 is permitted to flow to chamber 47 and from thence through the pipe 16 to chamber 37 above the column of mercury in the leg portion 21 of the U tube. Therefore, upon initially starting the compressor to compress fluid into the reservoir 45 the pressure of fluid in chamber 37 acting on one end of the mercury column in the U tube increases with that in chambers 38 and 39 acting on the other end of the mercury column.

When a predetermined control pressure is thus obtained in the chamber 37 the needle valve 48 is closed, thereby bottling in said chamber a predetermined amount of fluid under pressure which will not change during further operation of the compressor and which is adapted to control the operation of the governor, as will now be described.

As the pressure of fluid in the reservoir 45 continues to increase, such increase in the fluid pressure in chamber 38 acting on the mercury in the leg portion 22 of the U tube urges mercury from the leg portion 22 into the leg portion 21. This transfer of mercury shifts the center of gravity of the body of mercury to the left hand side of the axis of the flexible supporting members 8 and 9 and causes the U tube and thereby the switch tube 26 to turn in a counterclockwise direction. This movement of mercury and the consequent movement of the U tube and switch tube 26 will continue as the pressure of fluid in reservoir 45 and chamber 38 continues to be increased, and said tubes will therefore assume angular positions corresponding to the pressure of fluid in reservoir 45.

As the U tube and switch tube 26 are thus turned together, the mercury in the switch tube gradually flows from the right hand side of the journal pins 27 to the left hand side thereof until at the time a predetermined pressure is obtained in reservoir 45, the angular position of the switch tube 26 will be such that a sufficient portion of the mercury in the switch tube 26 will have moved to the left hand side of the journal pins 27 to unbalance said tube and cause same to turn relative to the U tube in a counterclockwise direction until the lug 31 thereon engages the raised portion 32 of the U tube. As a result of this movement of the switch tube, a sufficient flow of mercury away from the right hand end thereof occurs to reduce the level of mercury to below the contacts 34, thereby opening the circuit through the conductors 35 and causing the air compressor C to cease operating.

If, after the compressor is stopped, the pressure of fluid in the receiver 45 is reduced, due to being used or otherwise, the pressure of fluid in the chambers 38 and 39 in the leg portion 22 of the U tube reduces correspondingly. This permits the fluid pressure in chamber 37 in the leg portion 21 of the U tube to expand and force mercury back into the leg portion 22 thus shifting the center of gravity of the body of mercury to the right hand side of the axis of the U tube so as to turn the U tube in a clockwise direction. When the pressure of fluid in the reservoir 45 becomes reduced sufficiently to permit the pressure of fluid in chamber 37 to transfer sufficient mercury to the right hand side of the flexible support members 8 and 9 to turn said tube and thereby the switch tube 26 to a position in which sufficient mercury is transferred to the right hand side of the switch tube journal pins 27 to overbalance the switch tube, said switch tube turns in a clockwise direction relative to the U tube to the position shown in the drawing, in which the level of mercury at the right hand end thereof is increased sufficiently to bridge the contacts 34 and thereby start the compressor C. The compressor then operates to increase the pressure of fluid in the reservoir 45 until it is again stopped by the operation of the pressure governor in the manner above described.

From the above description it will be evident that the operation of the pressure governor to start and stop the compressor C is dependent upon shifting a sufficient amount of the mercury in the U tube from one leg portion to the other to change the angular position of the switch tube 26 sufficiently to cause the switch tube 26 to move relative to the U tube to either one or the other of its positions, in accordance with the direction of turning of the U tube. It will be further evident that while the U tube may turn at a relatively slow rate as governed by the rate of increase or decrease in pressure in the reservoir 45 and will occupy an angular position corresponding to the pressure of fluid in said reservoir, the switch tube 26 remains stationary with respect to said U tube until a predetermined transfer of mercury has occurred therein following which it will quickly move from one position to the other for causing prompt opening or closing of the circuit through the conductors 35.

If the compressor C is cut out of operation and the pressure of fluid in the reservoir 45 and thereby in chambers 38 and 39 in the leg portion 22 of the U tube is gradually reduced to a sufficiently low degree or to atmospheric pressure, due to being used or by draining of reservoir 45, the pressure of the fluid bottled in chamber 37 will force the mercury out of the leg portion 21 of said tube to substantially the upper level of the base portion 23 of said tube and fluid under pressure in chamber 37 will then flow through the mercury in the bridge portion 23 to chamber 38 and from thence to the receiver 45 until the pressure in chamber 37 is reduced to a degree where the weight of the mercury in the leg portion 22 of the U tube will raise the level in the left hand side sufficiently above the top level of the bridge 23 to prevent further flow from chamber 37 to chamber 38. In this manner, when the pressure of fluid in the receiver 45 is reduced to a sufficiently low degree or to that of the atmosphere, the pressure of fluid in chamber 37 of the U tube will also be reduced to a relatively low degree. This gradual movement of mercury into the leg portion 22 of the U tube will not however increase the height of mercury therein sufficiently to raise the check valve 25, which has a lower specific gravity than mercury, sufficiently to engage the seat 24.

If for any reason, however, there should be a sudden reduction in the pressure of the fluid in chambers 38 and 39 in the leg portion 22 of the U tube, due for instance to bursting of the receiver 45, the fluid pressure in the chamber 37 will suddenly expand and thereby act to effect a sudden movement of mercury into the leg portion 22 of the U tube. Under such a condition, the valve 25 is adapted to engage the seat 24 in order to prevent the mercury in the U tube escaping therefrom into the pipe 17 and other parts of the apparatus. In other words, under an abnormal condition such as just described, the check valve 25 will act to keep the mercury in the U tube so that the pressure governor will be in condition to operate when again required.

When the governor is first installed for controlling an air compressor or the like it may be necessary that the switch tube 26 be manually positioned to close the circuit through the conductors 35, as hereinbefore described. After the governor is once conditioned to operate however, the switch tube 26 will thereafter always be properly positioned, since when the pressure of fluid in the receiver is reduced, said switch tube will always turn to the position for increasing such pressure, as will be evident.

The pressure in the receiver 45 at which the pressure governor operates to start the compressor C is governed by the pressure of fluid admitted to and bottled in chamber 37 by operation of the needle valve 38. Let it be assumed that upon starting the compressor the needle valve 48 is closed when the pressure of fluid in chamber 37 is increased to a degree, such as, for instance, fifty pounds per square inch. At this time the same fluid pressure is acting in chambers 38 and 39 as in chamber 37 and the mercury is therefore standing at its normal level in both leg portions of the U tube, as shown in Fig. 1 of the drawing. As the pressure of fluid in the chambers 38 and 39 is then increased, mercury is moved from the leg portion 22 of the U tube into the leg portion 21, against the resistance of and compressing the fluid in chamber 37, and by the time the pressure of the fluid in the receiver and in chambers 38 and 39 has been increased a predetermined degree such as two and one-half pounds, above the fifty pounds at which pressure the needle valve 48 was closed, a sufficient displacement of mercury to the left hand side of the axis of the U tube will be obtained to operate the switch tube 26 to stop the compressor. A like reduction in the pressure of fluid in the receiver 45 below that initially provided in chamber 37 and a corresponding shifting of the mercury column into the leg portion 22 of the U tube is required to reverse the position of the switch tube 26 to again start the compressor. In other words, in the construction shown in Figs. 1 and 2, the pressure governor will operate to cause the pressure in the receiver 45 to be maintained within a certain limit, such as five pounds, and this limit is controlled by the relatively small volume of chamber 37 in which a considerable increase in the pressure of fluid is required to permit sufficient movement of the mercury column to stop the compressor, and a like reduction in pressure is required in the receiver to permit sufficient movement of the mercury column to start the compressor. If it is desired to provide a higher or a lower pressure in the reservoir 45 than above described, the needle valve 48 is operated to provide the desired mean pressure in chamber 37 after which the governor device will act to provide a corresponding pressure in the receiver 45, the range of pressure in the receiver being, however, substantially the same as above described, that is, as controlled by the volume of chamber 37.

In the above description it is assumed that the U tube will stand, as shown in the drawing, with the mercury at the same height in both leg portions thereof when the needle valve 48 is open at the time of starting the compressor, in which case, as above described, the fluid pressure provided in chamber 37 at the time the needle valve is closed is the mean of the pressure range of the governor. If however, the U tube should be in the compressor starting position, that is, turned clockwise to that shown, at the time the needle valve is closed, the pressure thus bottled in chamber 37 may be substantially equal to the minimum adapted to be maintained in the reservoir 45, in which case the maximum obtained in the reservoir will be substantially equal to the range of the governor above the minimum.

In order to meet certain requirements it may be desirable that the pressure governor operate to maintain the pressure in the receiver 45 within closer limits than obtainable with the construction shown in Figs. 1 and 2 of the drawing, that is, instead of the governor operating on a range such as five pounds, as above described, it may be desirable that the governor operate on a range as small as one pound or even less, in which case the governor would start the compressor when the pressure in the receiver would be reduced only one pound, or whatever other degree is desired, below that in the receiver at the time the compressor was stopped, and then stop the compressor when the pressure in the receiver is increased this amount above that in the receiver at the time the compressor was started.

A pressure governor to meet these conditions has to be very sensitive to slight variations in fluid pressure and such a structure is disclosed in the modification shown in Figs. 3 and 4 of the drawing.

According to the modification shown in Figs. 3 and 4 of the drawing an element 49, instead of the element 13 is provided between the lower ends of the members 8 and 9 and has two separate chambers 50 and 51. The chamber 50 corresponds to chamber 41 in the element 13 and is connected through the flexible member 8 to the receiver 45 and through the pipe 17 to chambers 39 and 38 in the leg portion 22 of the U tube, so that the pressure of fluid in chambers 39 and 38 will vary with that in the receiver 45, as in the construction above described. The chamber 51 in the element 49 is connected through the pipe 16 to chamber 37 in the U tube, through passage 52 in angle fitting 14, passage 53 in the flexible member 9, passage 54 in the support member 6 and a pipe 55 to a volume or reservoir 56 the sole purpose of which is to increase in effect the volume of chamber 37 in the U tube.

The pipe 55 is connected through a manually operated cut-off valve 57 to pipe 44 leading to the receiver 45. The cut-off valve 57 in this construction is adapted to serve the purpose of the needle valve 48 in the construction shown in Figs. 1 and 2.

In the operation of the modified form of the invention, the cut-off valve 57 is initially positioned to permit fluid to flow from pipe 44 to the reservoir 56 and to chamber 37 in the U tube, upon starting the compressor C. When, due to operation of the compressor, a predetermined pressure of fluid is obtained in the reservoir 45 and thereby in the reservoir 56 and chamber 37, the cut-off valve 57 is operated to close communication from said reservoir to the pipe 55 and thereby bottle up the fluid under pressure contained in the reservoir 56 and chamber 37, the pressure in the reservoir 56 and chamber 37 being then adapted to act to control the operation of the governor in the same manner in which the pressure in chamber 37 controls the operation of the governor shown in Figs. 1 and 2.

As the pressure of fluid is then increased in the reservoir or receiver 45 and thereby in chambers 39 and 38 in the U tube, and mercury is thereby shifted into the leg portion 21 of said tube, the pressure of fluid is not increased in the control chamber 37 as great an amount, as in the construction shown in Figs. 1 and 2, due to the additional volume of the reservoir 56 connected to chamber 37, that is, due to the addition of said reservoir a less increase in pressure is effected in chamber 37 by the movement of mercury required for operating the switch tube 26, and as a consequence, there is a correspondingly lower resistance to such movement than in the construction shown in Figs. 1 and 2.

In other words, assume that in the construction shown in Figs. 1 and 2 the movement of a sufficient amount of mercury for effecting operation of the switch tube 26 effects a five pound increase in pressure in chamber 37. Chamber 37 by itself is a relatively small volume, but when this volume is increased by the addition of the reservoir 56, the increase in fluid pressure therein due to the movement of mercury required for effecting operation of the switch tube 26 is less than five pounds by an amount which depends upon the volume of the reservoir 56. In further explanation, assume that the chamber 37 and reservoir 56 are initially charged with fluid at fifty pounds pressure per square inch. The reservoir 56 may be of such size that at the time sufficient mercury is shifted into the leg portion 21 of the U tube to operate the switch tube 26 to stop the compressor the fluid pressure in chamber 37 and reservoir 56 will be increased to only fifty and one-half pounds, and conversely, a reduction to forty-nine and one-half pounds in the fluid pressure in receiver 45 and chamber 37 of the U tube will permit the expansion of the fluid pressure in reservoir 56 and chamber 37 to effect a sufficient movement of the mercury in the opposite direction to start the compressor. In the operation of this modified form of governor, there will therefore be only a relatively small variation in pressure, such as one pound, in chamber 37 between the starting and stopping of the compressor, and since the fluid pressure in reservoir 45 is always substantially equal to that in chamber 37 the pressure in said reservoir will therefore be maintained within corresponding limits.

By providing the proper size of reservoir 56 the governor may be caused to operate to maintain the pressure in the receiver 45 within any desired limits. If desired, the reservoir 56 may even be large enough to prevent any appreciable variation in the fluid pressure in chamber 37 due to the variation in volume thereof caused by shifting of the mercury column from one position to the other, under which condition the governor device might even be caused to operate on an infinitely small range.

The pressure of fluid obtained in the reservoir 45 may be adjusted to any desired degree by providing the proper degree of fluid pressure in chamber 37 and reservoir 56 when initially charging the reservoir 45, as in the construction shown in Figs. 1 and 2, as will be evident.

From the above description it will be noted that the pressure governor will automatically operate to control the operation of an air compressor or the like so as to provide any desired pressure in a receiver as governed by the predetermined fluid pressure initially provided in the control chamber 37, and in the connected volume increasing reservoir 56, if employed, while the pressure limits or range of control may be adjusted to any desired degree by adding to chamber 37 the proper size of volume increasing reservoir 56.

The governor is simple in construction and will operate over a long period of time with the same degree of accuracy of control as when new, since there are no mechanical parts subject to excessive stress and wear, as in conventional governors. The only parts subject to wear are the journal pins 27 of the switch tube 26, but the load on these pins is so light that they will last indefinitely. The flexible members 8 and 9 are subject to fatigue but they also will last for an indefinite period.

While one illustrative embodiment of the invention has been described in detail, it is not the intention to limit the scope of the invention to that embodiment or otherwise than by the terms of the appended claims.

Having now described my invention, what I claim as new and desire to secure by Letters Patent, is:

1. A pressure governor comprising a pair of spaced flexible elements supported at their upper ends, a hollow U tube disposed between said elements, a member secured to the lower ends of said elements and supporting said U tube whereby said member and U tube are rockable upon flexing of said elements, a quantity of liquid in said U tube subject to bottled fluid pressure in a control chamber formed above said fluid in one end of said U tube for urging said liquid toward the other end of said tube for thereby shifting the center of gravity of said liquid to effect rocking of said U tube in one direction, said liquid being subject to the pressure of fluid in another chamber formed in the other end of said U tube and being movable thereby upon an increase in the degree thereof toward said control chamber for thereby shifting the center of gravity of said liquid to effect rocking of said U tube in the opposite direction, means independent of said liquid for regulating the amount of fluid pressure acting in said control chamber, and means controlled by the rocking of said U tube for controlling the pressure of fluid in said other chamber.

2. A pressure governor comprising a pair of spaced flexible elements supported at their upper ends, a hollow U tube disposed between said elements, a member secured to the lower ends of said elements and supporting said U tube whereby said member and U tube are rockable upon flexing of said elements, a quantity of liquid in said U tube subject to bottled fluid pressure in a control chamber formed above said fluid in one end of said U tube for urging said liquid toward the other end of said tube for thereby shifting the center of gravity of said liquid to effect rocking of said U tube in one direction, said liquid being subject to the pressure of fluid in another chamber formed in the other end of said U tube and being movable thereby upon an increase in the degree thereof toward said control chamber for thereby shifting the center of gravity of said liquid to effect rocking of said U tube in the opposite direction, communication through which the pressure of fluid is varied in the last named chamber being through said member and a passage in one of said flexible elements, and means controlled by the rocking of said U tube for controlling the pressure of fluid in said other chamber.

3. A pressure governor comprising a pair of spaced flexible elements supported at their upper ends, a hollow U tube disposed between said elements, a member secured to the lower ends of said elements and supporting said U tube whereby said member and U tube are rockable upon flexing of said elements, a quantity of liquid in said U tube subject to bottled fluid pressure in a control chamber formed above said fluid in one end of said U tube for urging said liquid toward the other end of said tube for thereby shifting the center of gravity of said liquid to effect rocking of said U tube in one direction, said liquid being subject to the pressure of fluid in another chamber formed in the other end of said U tube and being movable thereby upon an increase in the degree thereof toward said control chamber for thereby shifting the center of gravity of said liquid to effect rocking of said U tube in the opposite direction, said member having two compartments one of which is in permanent communication with said other chamber and the other of which is in permanent communication with said control chamber, one of said flexible elements having a fluid conducting passage open to the first named compartment through which passage and compartment the pressure of fluid in said other chamber is adapted to be varied, a valve controlling a communication between said compartments for adjusting the pressure of fluid in said control chamber and operative to close said communication for bottling the fluid pressure in said control chamber, and means controlled by the rocking of said U tube for controlling the pressure of fluid supplied to said fluid conducting passage to act in said other chamber.

4. A pressure governor comprising a pair of spaced flexible elements supported at their upper ends, a hollow U tube disposed between said elements, a member secured to the lower ends of said elements and supporting said U tube whereby said member and U tube are rockable upon flexing of said elements, a quantity of liquid in said U tube subject to bottled fluid pressure in a control chamber formed above said fluid in one end of said U tube for urging said liquid toward the other end of said tube for thereby shifting the center of gravity of said liquid to effect rocking of said U tube in one direction, said liquid being subject to the pressure of fluid in another chamber formed in the other end of said U tube and being movable thereby upon an increase in the degree thereof toward said control chamber for thereby shifting the center of gravity of said liquid to effect rocking of said U tube in the opposite direction, said member having two compartments one of which is in permanent communication with said other chamber and the other of which is in permanent communication with said control chamber, one of said flexible elements having a fluid conducting passage open to the first named compartment through which passage and compartment the pressure of fluid in said other chamber is adapted to be varied, the other flexible element having a fluid conducting passage open to the second named compartment, a pressure volume connected to the last named passage at the supported end of the flexible element, means for adjusting the pressure of fluid in said pressure volume and said connected control chamber and for bottling same therein, and means controlled by the rocking of said U tube for controlling the pressure of fluid supplied through the passage in the flexible element connected to the first named compartment to act in said other chamber.

5. A pressure governor comprising a pair of spaced flexible elements supported at their upper ends, a hollow U tube disposed between said elements, a member secured to the lower ends of said elements and supporting said U tube whereby said member and U tube are rockable upon flexing of said elements, a quantity of liquid in said U tube subject to bottled fluid pressure in a control chamber formed above said fluid in one end of said U tube for urging said liquid toward the other end of said tube for thereby shifting the center of gravity of said liquid to effect rocking of said U tube in one direction, said liquid being subject to the pressure of fluid in another chamber formed in the other end of said U tube and being movable thereby upon an increase in the degree thereof toward said control chamber for thereby shifting the center of gravity of said liquid to effect rocking of said U tube in the opposite direction, a chambered element mounted to rock relative to said U tube and containing a quantity of liquid adapted to self-rock said element after sufficient movement thereof to cause said liquid to shift so that its center of gravity is moved from one side of the rocking axis to the other, means associated with said U tube for rocking said chambered element to shift the liquid therein, and means operable upon self-rocking of said chambered element for controlling the pressure of fluid in said other chamber.

6. A pressure responsive governor comprising means mounted to rock about an axis, a movable mass associated with said means and movable relatively thereto and to the axis thereof for rocking said means, said mass communicating with two chambers and being subject to a control fluid pressure bottled in one of said chambers and to an opposing variable fluid pressure in the other of said chambers and being movable relatively to the rockable means upon an increase in said variable fluid pressure for shifting its center of gravity to one side of said axis for turning said rockable means in one direction and being movable relatively to said rockable means by said control fluid pressure upon said variable fluid pressure being reduced for shifting its center of gravity to the opposite side of said axis for turning said rockable means in the opposite direction, means for admitting variable amounts of fluid under pressure to said one chamber and for bottling same therein, and means operative upon rocking of said rockable means for controlling the degree of said variable fluid pressure.

7. A pressure responsive governor comprising means mounted to rock about an axis, a movable mass associated with said means and movable relatively thereto and to the axis thereof for rocking said means, said mass communicating with two chambers and being subject to a control fluid pressure bottled in one of said chambers and to an opposing variable fluid pressure in the other of said chambers and being movable relatively to the rockable means upon an increase in said variable fluid pressure for shifting its center of gravity to one side of said axis for turning said rockable means in one direction and being movable relatively to said rockable means by said control fluid pressure upon the variable fluid pressure being reduced for shifting its center of gravity to the opposite side of said axis for turning said rockable means in the opposite direction, a reservoir of chosen volume open to said one chamber, means for admitting variable amounts of fluid under pressure to said one chamber and reservoir and for bottling same therein, and means operative upon rocking of said rockable means for controlling said variable fluid pressure.

8. A pressure responsive governor comprising means mounted to rock about an axis, a movable mass associated with said means and movable relatively thereto and to the axis thereof for rocking said means, said mass communicating with two chambers and being subject to a control fluid pressure bottled in one of said chambers and to an opposing variable fluid pressure in the other of said chambers and being movable relatively to the rockable means upon an increase in said variable fluid pressure for shifting its center of gravity to one side of said axis for turning said rockable means in one direction and being movable relatively to said rockable means by said control fluid pressure upon said variable fluid pressure being reduced for shifting its center of gravity to the opposite side of said axis for turning said rockable means in the opposite direction, valve means for supplying said control fluid pressure to said one chamber and for bottling the fluid pressure therein, and means operable upon rocking of said rockable means for controlling said variable fluid pressure.

9. A pressure governor comprising a hollow member, flexible supporting means for said member adapted to permit rocking of said member about an axis, said member containing a column of liquid and having a control chamber and another chamber, said liquid separating said chambers from each other and being subject to bottled fluid pressure in said control chamber acting to urge said liquid toward the other end of said member for thereby shifting its center of gravity to effect rocking of said member in one direction, said liquid being subject in said other chamber to the pressure of fluid and being movable thereby upon an increase in the degree thereof towards the control chamber end of said tube for thereby shifting its center of gravity to effect rocking of said member in the opposite direction, means controlled by the rocking of said member for controlling the fluid pressure in said other chamber, communication through which the pressure of fluid in said other chamber is controlled being through said flexible means, and means controlling a passageway between said communication and said control chamber through which fluid under pressure is adapted to be supplied to said control chamber and operative to close said passageway for bottling up the fluid under pressure thus supplied to said control chamber.

10. A pressure governor comprising a hollow member, flexible supporting means for said member adapted to permit rocking of said member about an axis, said member containing a column of liquid and having at one end a control chamber and at the opposite end another chamber, said liquid separating said chambers and being subject to bottled fluid pressure in said control chamber acting to urge said liquid toward the other end of said member for thereby shifting its center of gravity to effect rocking of said member in one direction, said liquid being subject in the other of said chambers to the pressure of fluid and being movable thereby upon an increase in the degree thereof towards the control chamber end of said tube for thereby shifting its center of gravity to effect rocking of said member in the opposite direction, means controlled by the rocking of said member for controlling the fluid pressure in said other chamber, a reservoir communicating with said control chamber through said flexible supporting means, and means for regulating the pressure of fluid in said reservoir and control chamber and for bottling same therein.

11. A pressure governor comprising a rockable member having a pressure chamber, means for rocking said member in one direction upon an increase in the pressure of fluid in said chamber and for rocking said member in the opposite direction upon a reduction in the pressure of fluid in said chamber, a chambered element mounted to rock and containing a quantity of liquid adapted to self-rock said element after sufficient movement thereof to cause said liquid to shift so that its center of gravity is moved from one side of the rocking axis to the other, means for moving said element upon movement of said member, and means operable upon self-rocking of said element for controlling said fluid pressure in said chamber.

BURTON S. AIKMAN.

CERTIFICATE OF CORRECTION.

Patent No. 2,180,856.                                November 21, 1939.

BURTON S. AIKMAN.

It is hereby certified that error appears in the printed specification of the above numbered patent requiring correction as follows: Page 6, second column, line 36, claim 8, for the word "operable" read operative; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.